(12) United States Patent
Olivier

(10) Patent No.: US 8,348,543 B2
(45) Date of Patent: Jan. 8, 2013

(54) STREAMER CONNECTION SYSTEM

(75) Inventor: André W. Olivier, River Ridge, LA (US)

(73) Assignee: ION Geophysical Corporation, Houston, TX (US)

( * ) Notice: Subject to any disclaimer, the term of this patent is extended or adjusted under 35 U.S.C. 154(b) by 296 days.

(21) Appl. No.: 12/409,301

(22) Filed: Mar. 23, 2009

(65) Prior Publication Data

US 2010/0239367 A1    Sep. 23, 2010

(51) Int. Cl.
F16D 1/08        (2006.01)
(52) U.S. Cl. .................................. 403/353; 114/245
(58) Field of Classification Search ............. 403/109.1, 403/109.2, 109.3, 109.5, 192, 195, 321, 325, 403/329, 353, 365; 114/245, 243, 253; 441/133
See application file for complete search history.

(56) References Cited

U.S. PATENT DOCUMENTS

| 3,648,642 | A | | 3/1972 | Fetrow et al. |
| 3,931,608 | A | | 1/1976 | Cole |
| 4,290,124 | A | | 9/1981 | Cole |
| 4,711,194 | A | | 12/1987 | Fowler |
| 4,879,719 | A | | 11/1989 | Dumestre, III |
| 5,214,612 | A | | 5/1993 | Olivier et al. |
| 5,278,804 | A | | 1/1994 | Halvorsen |
| 5,507,243 | A | | 4/1996 | Williams et al. |
| 5,529,011 | A | | 6/1996 | Williams, Jr. |
| 5,619,474 | A | | 4/1997 | Kuche |
| 5,709,497 | A | | 1/1998 | Zoch et al. |
| 5,937,782 | A | * | 8/1999 | Rau .............................. 114/247 |
| 6,034,923 | A | | 3/2000 | Wooters |
| 6,091,670 | A | | 7/2000 | Oliver et al. |
| 6,263,823 | B1 | | 7/2001 | Olivier |
| 6,397,773 | B2 | * | 6/2002 | Olivier ......................... 114/245 |
| 6,438,784 | B1 | * | 8/2002 | Yu ..................................... 15/106 |
| 6,503,019 | B1 | * | 1/2003 | Wang ......................... 403/109.1 |
| 6,525,991 | B2 | * | 2/2003 | Greiger ............................ 367/16 |
| 6,761,501 | B1 | * | 7/2004 | Nakatani .................... 403/109.5 |
| 6,808,407 | B1 | * | 10/2004 | Cannon ......................... 439/314 |
| 6,824,180 | B2 | * | 11/2004 | Tomchak ........................ 294/57 |
| 6,854,916 | B2 | * | 2/2005 | Hsieh ......................... 403/109.3 |
| 6,854,919 | B2 | * | 2/2005 | Neumann et al. ............. 403/326 |
| 7,184,365 | B2 | * | 2/2007 | George et al. ................... 367/20 |
| 7,404,686 | B2 | * | 7/2008 | Volum ....................... 403/109.8 |
| 7,469,653 | B2 | * | 12/2008 | Olivier et al. ................. 114/245 |
| 7,503,794 | B2 | * | 3/2009 | Haller ............................ 439/357 |
| 7,623,411 | B2 | * | 11/2009 | Faucheaux et al. ............. 367/16 |
| 2003/0226488 | A1 | | 12/2003 | Grieger et al. |
| 2003/0235463 | A1 | * | 12/2003 | Neumann et al. ............. 403/329 |
| 2008/0181717 | A1 | * | 7/2008 | Olivier et al. .................... 403/24 |
| 2008/0291778 | A1 | * | 11/2008 | Faucheaux et al. ............. 367/16 |

* cited by examiner

Primary Examiner — Michael P Ferguson
Assistant Examiner — Daniel Wiley
(74) Attorney, Agent, or Firm — James T. Cronvich

(57) ABSTRACT

A connection system for connecting external devices to specified locations on a marine seismic streamer. Inner collars having raised bosses are clamped to the cable at specified locations along its length. Each inner collar forms a circular race encircling the cable. An external device is attached to a pair of cuffs in the form of C-shaped cylindrical rings each with a circular inner surface. A gap in the ring interrupts the inner surface. The width of the gap is greater than the diameter of the bosses so that the cuffs may be slid onto the collars when the gaps are aligned with the bosses. The bosses are circumferentially offset when the cable is in its normal operating state to lock the cuff and the external device to the collars. The cuffs and the external device can be installed on or removed from the cable by twisting the cable to align the bosses and sliding the cuffs onto or off of the collars. When installed, the cuffs ride on the races to allow the cable to rotate inside the cuffs.

14 Claims, 9 Drawing Sheets

STREAMER CONNECTION SYSTEM

BACKGROUND

This invention relates to marine seismic prospecting and, more particularly, to a connection system for attaching equipment to and detaching equipment from marine seismic cables.

A marine seismic streamer is a cable, typically several thousand meters long, that contains arrays of hydrophones and associated electronic equipment along its length. One purpose of the streamer is to position the hydrophone array at a known depth and orientation relative to a towing vessel in a survey area. Externally mounted equipment, such as depth controllers, called "birds," streamer recovery pods, and acoustic pods, performs the functions of positioning and controlling the cable. Individual devices of these kinds of external equipment are attached to the streamer at various positions along its length. All of these external devices should be both attached to and removed from the cable as quickly and reliably as possible. Operational expenses of seismic vessels require rapid attachment and detachment of these external devices. Because these external devices typically cost thousands of dollars, they demand the highest degree of reliability from any attachment scheme. Cable attachment failures caused by connector failures or by cable accidents result in a significant financial loss both in time and in expensive equipment.

Today's typical cable attachment solutions consist of a collar arrangement that relies on a hinge and latch mechanism for operation. Examples of these mechanisms are described in U.S. Pat. No. 5,507,243, "Connector For Underwater Cables," Apr. 16, 1996, to Oneil J. Williams et al. and in U.S. Pat. No. 5,709,497, "Latching Device," Jan. 20, 1998, to David W. Zoch et al. External devices attached to the collars are clamped around races on the cable as the cable is payed out from the back deck of a survey vessel. The races allow the cable to rotate inside the collars while the external devices do not rotate as they are towed along. Conventional connector schemes usually require one operator to position and hold the awkward external device in place while a second operator secures the manual latching collars to the cable, often while trying to maintain balance on a rolling survey vessel. Requiring two operators significantly increases the cost of operation.

These conventional mechanisms also incorporate springs or pins having dissimilar metals in contact with the collar. Dissimilar metals in contact in seawater corrode because of galvanic reactions. While conventional hinge-and-latch collars offer quick attachment and removal when new, exposure to salt water degrades their performance and can eventually lead to their complete failure. A failed collar can result in the loss of an external electronic device or a jammed connector on the seismic cable, which costs time in removing external devices as the cable is reeled in.

A thick cross section (typically of aluminum) is required to safely imbed a conventional latching mechanism within the collar. Such a large cross section creates hydrodynamic noise and lateral accelerations on the seismic cable as it is towed through the water. These undesirable characteristics corrupt the sensitive measurement of seismic acoustic signals by the hydrophones.

The Quick Cuff™ connector, sold by ION Geophysical Corporation of Houston, Tex., U.S.A. and described in U.S. Pat. Nos. 6,263,823 and 6,397,773, "Connector System for Connecting Equipment to Underwater Cables," Jul. 24, 2001, and Jun. 4, 2002, to André W. Olivier, avoids many of those shortcomings and provides these advantages: a marine cable connection having no moving parts, which is more reliable than prior art connections; a marine cable connection that performs the same whether brand new or aged as a result of long term exposure to seawater; a marine cable connection that requires fewer operators to safely operate; a marine cable connection with a lower hydrodynamic noise profile because of the lack of a salient attachment mechanism; a marine cable connection that can readily be adapted to both existing seismic cables as well as new technology cables; a marine cable connection that is lighter and simpler than existing connectors; a marine cable connection that consists of an inner race and an outer collar engaged by means of geometrical features rather than a mechanism; and a marine cable connection that is significantly quicker to operate than prior art connectors. The Quick Cuff™ connector system includes a cuff attached to a device, such as a cable-leveling or -steering bird or an acoustic transceiver, to be connected to the streamer cable at a known location. The C-shaped cylindrical cuff has a circular inner surface interrupted by a gap. A throat is formed by the gap in the cuff extending the length of the cuff. The spacing between the ends of the C across the throat defines the width of the gap. The width of the gap is slightly larger than the diameter of the streamer cable so that the cuff can slip onto the cable. An inner collar having a race is affixed to the cable at a known location. The diameter of the race is greater than the width of the gap formed by the cuff's throat. The inner surface of the cuff can be slid into position on the race of the inner collar. Because the diameter of the race exceeds the width of the gap of the throat, the cuff and the attached equipment cannot disconnect radially from the inner collar. Structural elements, such as retainer pins extending from the external device through a slot in the cuff and into a groove on the collar, further hinder longitudinal displacement of the cuff along the inner collar. But some devices, such as streamer recovery pods not sold by ION Geophysical Corporation, do not have retainer pins, and, in some marine conditions, such as a following sea, these external devices may be pushed forward so that the cuffs disengage the races.

SUMMARY

An innovative cable connection system having features of the invention includes a first collar attached around an underwater cable at a specified location and a second collar attached around the cable at a spaced apart location. The first and second collars each have a race and a raised boss on their peripheries. A first C-shaped cuff rotatably mounted to the first collar includes an inner surface for riding on the race of the first collar. A throat is formed in the C-shaped cuff by a longitudinal gap between the ends of the C. The gap has a width between the ends of the C greater than or equal to a maximum circumferential dimension of the boss on the first collar. A similar second C-shaped cuff is rotatably mounted to the second collar.

Another version of a connection system comprises a collar attachable around an underwater cable and a C-shaped cuff. The collar includes a raised boss on its periphery at a forward end of a circumferential bearing race. The C-shaped cuff has an inner cylindrical surface for riding on the bearing race of the collar. A throat is formed in the C-shaped cuff by a longitudinal gap between the ends of the C. The gap has a width between the ends of the C wide enough to clear the boss as the cuff slides onto and off of the collar. The boss prevents the cuff from leaving the race when the gap is circumferentially offset from the boss.

Another aspect of the invention provides a collar for rotatably connecting an external device to a seismic cable. The collar comprises a race extending circumferentially around the periphery of the collar, a raised shoulder at an aft end of the race, and a raised boss disposed at an opposite fore end of the race and extending part of the way around the collar's periphery.

In another aspect of the invention, a method for attaching an external device attached to a pair of cuffs to a pair of collars, each including a race and a raised boss, mounted on an underwater cable, comprises: (a) fastening a pair of cuffs with throats to an external device; (b) rotating the collars relative to each other to align the bosses on the two collars; (c) slipping the cuffs radially over the twisted cable through the throat; (d) sliding the cuffs longitudinally along the cable with the aligned bosses through the throats and into position around the inner collar; and (e) rotating the collars relative to each other to offset the bosses.

A method for detaching an external device attached to a pair of cuffs, each having a throat, from a pair of collars, each including a raised boss, mounted on an underwater cable, comprises: (a) rotating the collars relative to each other to align the bosses on the two collars; (b) sliding the cuffs longitudinally along the collars on the twisted cable with the aligned bosses received in the throat until clear of the collar; and (c) slipping the cuff attached to the external device radially off the cable.

BRIEF DESCRIPTION OF THE DRAWINGS

These and other features, aspects, and advantages of the invention are better understood by referring to the following description, appended claims, and accompanying drawings in which:

DETAILED DESCRIPTION

Figure 1:
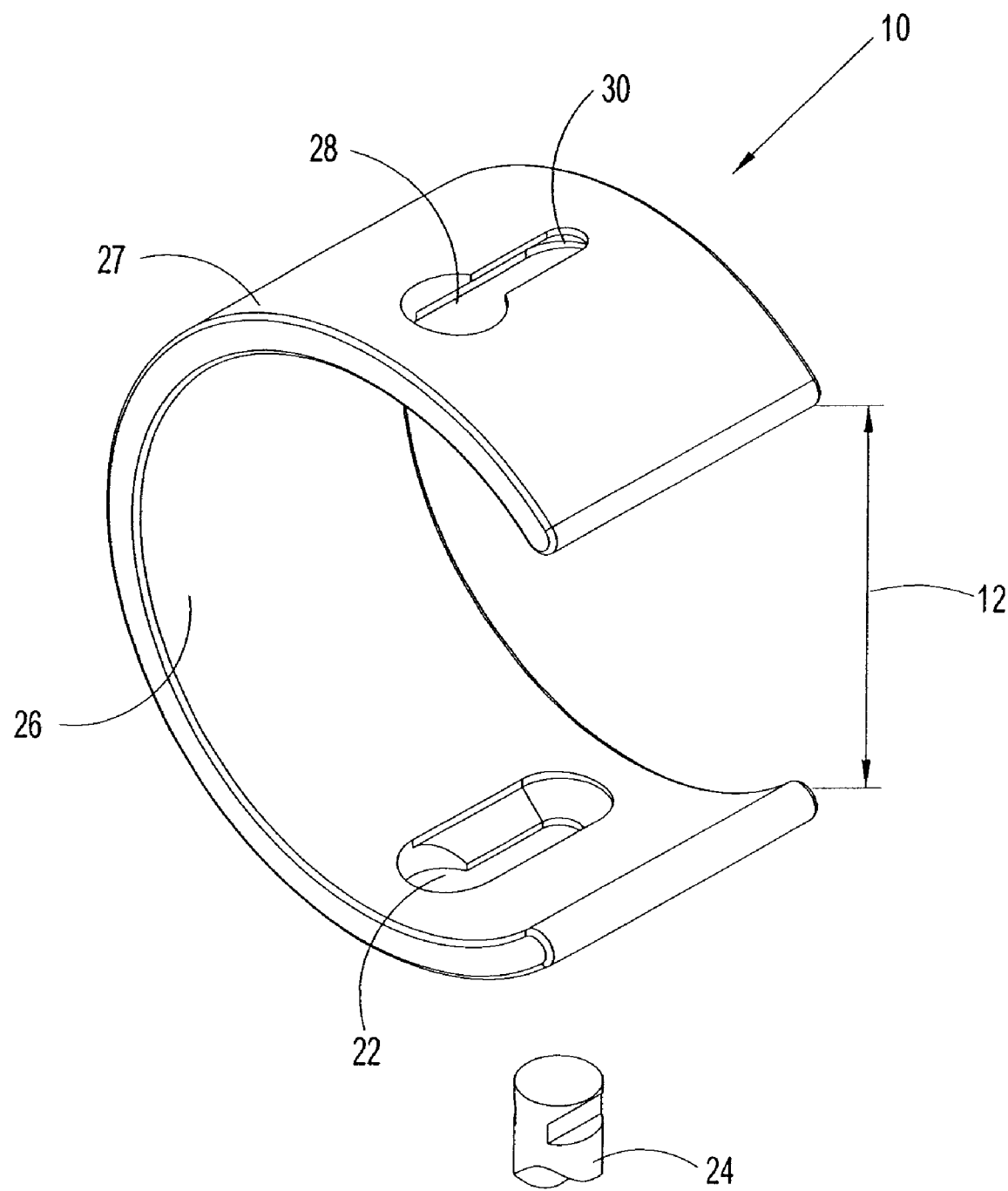
FIG. 1 is a perspective view of one version of a connector for use in a system for connecting devices to an underwater cable embodying features of the invention.
Figure 2:
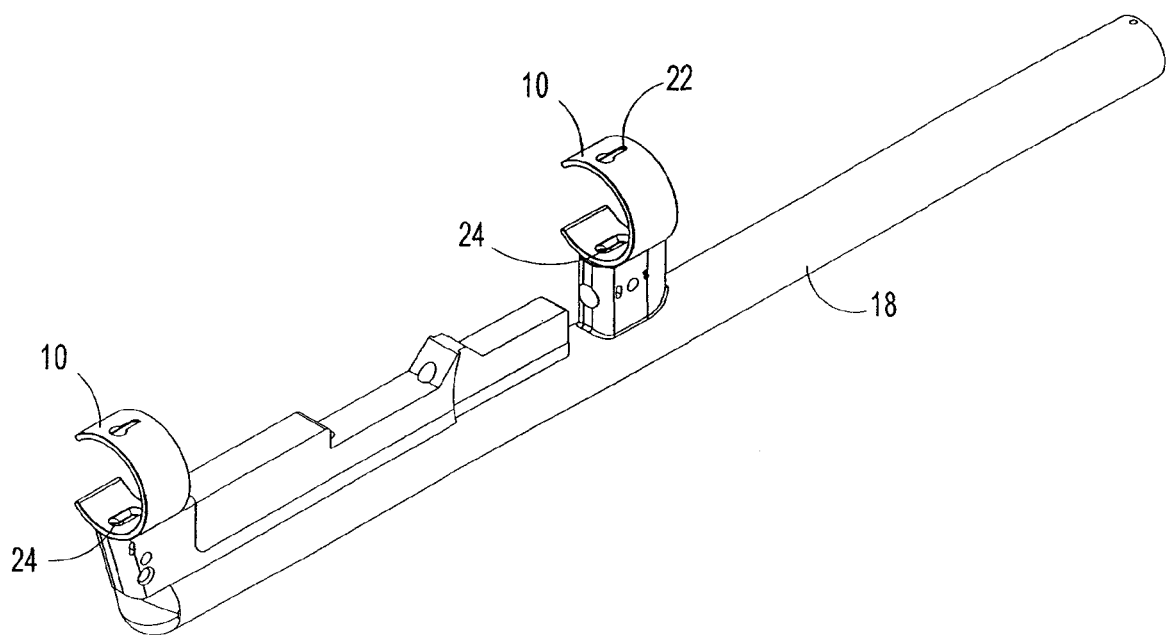
FIG. 2 is a perspective view of two connectors as in FIG. 1 shown attached to an external device, in this example, a cable-leveling bird.

One example of a system embodying features of the invention for connecting external devices to an underwater cable is shown in FIGS. 1-4 and in U.S. Pat. Nos. 6,263,823 and 6,397,773, "Connector System for Connecting Equipment to Underwater Cables," Jul. 24, 2001, and Jun. 4, 2002, to André W. Olivier, incorporated by reference. A key component of the system, which achieves a reliable, mechanism-free, connection to the seismic cable, is a C-shaped cylindrical ring, or cuff 10, serving as an outer collar. The cuff has an opening, or throat 12, formed by a gap in the cuff along the length of the cuff between the ends of the C. The width of the gap between the ends of the C across the throat is slightly larger than the diameter 14 of an underwater seismic cable 16. The cuff is preferably of unitary construction, i.e., no dissimilar metals or moving parts, fabricated from a material that will survive long term exposure to seawater and can withstand extensive mechanical loads. Because the cuff freely rotates about the cable similar to the outer race of a journal bearing, friction, especially along its inner surface 26, must be minimized. Materials such as aluminum, titanium, and engineering grade plastics are preferred for the cuff. Each external device 18, such as a cable-leveling bird as depicted in FIGS. 2 and 4, an acoustic transmitter, receiver, or transceiver, a cable recovery device, or a float tube, to be connected to the cable typically has two attach points requiring two cuffs. (Of course, external devices with a single cuff are also possible.) The cuffs are attached to the external devices, for example, by attachment means using conventional external device hardware 20 as shown in the cutaway portion of FIG. 4E and described, for example, in U.S. Pat. No. 5,214,612, "Swing Plate Latch Mechanism," May 25, 1993, to André W. Olivier et al., the disclosure of which is incorporated by reference. In the version shown, two keyways 22 machined 1800 apart around the circumference of the cuff accept a dovetail pin 24 extending from the external device through an outer surface 27 of the cuff. The keyway has a circular opening 28 at one end to accept the head of the dovetail pin and a narrower slotted portion 30 extending from the circular opening to the other end of the keyway. The dovetail pin acts as a self-centering guide and swivel. Two keyways are provided to enable the mounting of two external devices, such as a bird and a float tube, per connection location on a seismic cable. The throat is preferably positioned about midway between the two keyways so that the throat assumes an orientation on the cable not facing upward. The important point is that the throat should not be positioned on the cuff diametrically opposite an attached external device. In other words, the throat should be spaced circumferentially around the cuff less than 180° from the attached external device.

Figure 3:
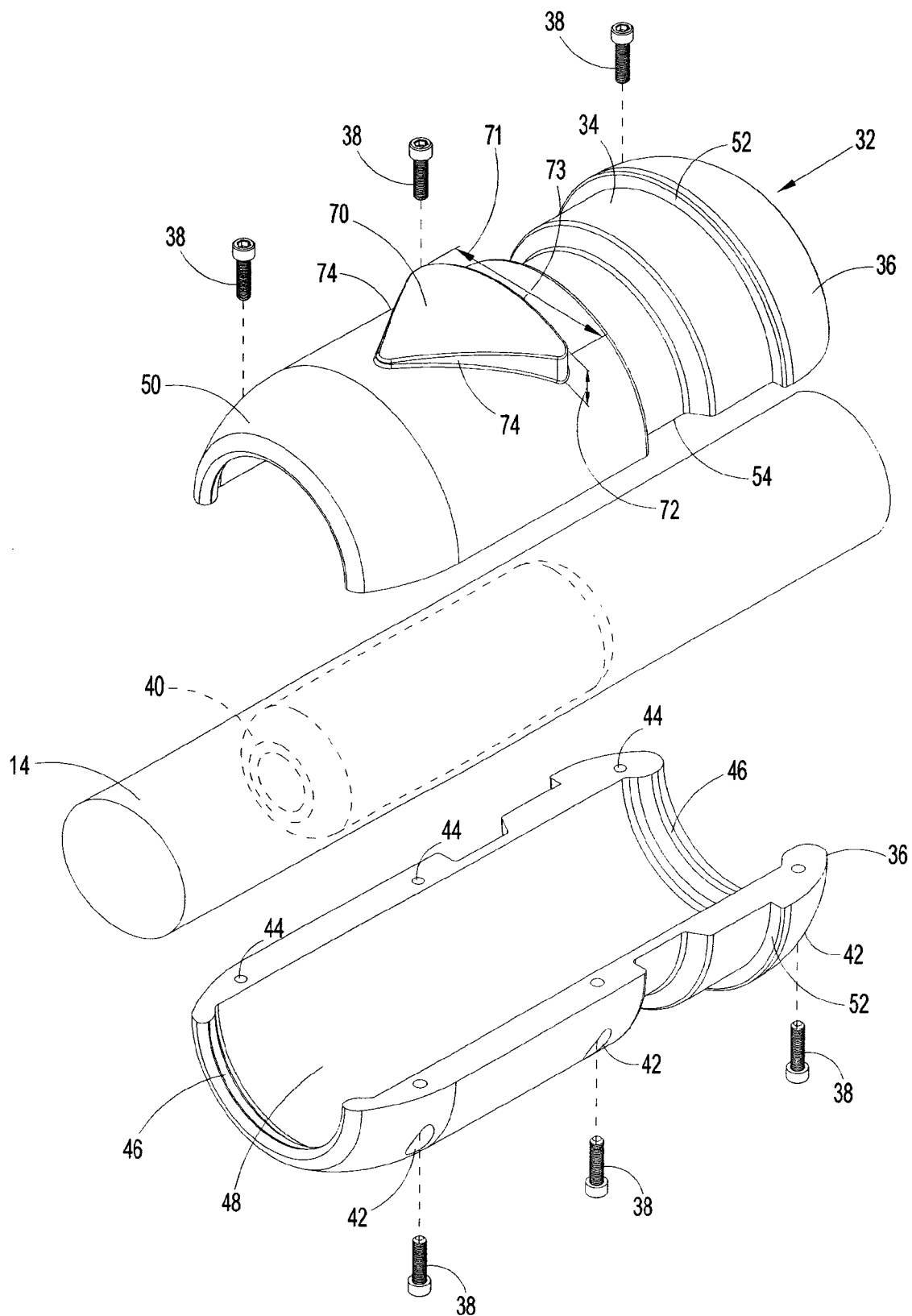
FIG. 3 is an exploded perspective view of an inner collar showing its attachment to a section of an underwater cable.

As shown in FIG. 3, an inner collar 32 is semi-permanently clamped around the cable 14 and establishes a longitudinal mounting position along the cable's length and forms the inner bearing race 34 for the cuff. The inner collar consists of two symmetrical halves 36, which are screwed together around the cable with screws or bolts 38 typically on top or in front of a cable spacer 40 located within the cable. Screw holes 42 on one side of the collar halves admit the screw heads, which thread into threaded holes 44 on the other side of the collar halves. Structural elements, such as a pair of raised circumferential ribs 46, are included along the interior surface 48, which can be sized differently to match different seismic cables. The elements prevent longitudinal movement of the collar along the cable and, therefore, of an attached external device. As shown in FIG. 3, the ribs are spaced to just span the fixed cable spacer, which holds the clamped inner race in place. A beveled surface 50 at the fore end of the inner collar facilitates self-centering of the cuff. A bearing shoulder 52 at the aft end prevents longitudinal translation of the external device once installed. The shoulder may extend continuously all the way around the collar for a maximum circumferential extent of 360°, but could be segmented. A circumferential groove 54 accepts a conventional retractable pin 56 extending from the external device. The spring-biased, self-activating pin allows the external device with attached cuff to snap in place in the race and further prevents forward translation of the external device along the cable. A protrusion, or raised boss 70, on the periphery of the inner collar aft of the beveled surface 50 defines, with the shoulder 52, the race 34. The boss has a maximum circumferential dimension 71 and a maximum thickness 72. A rear bearing surface on the boss provides a forward bearing stop 73. The boss is shown triangular in shape with the stop forming a base of the curved triangle and the other two curved sides 74 forming guide surfaces that help guide the cuff onto the collar. The boss is also hydrodynamically tapered in thickness from front to rear to reduce flow noise. But the boss could be made other hydrodynamic shapes. The inner collar 32 is preferably fabricated from a plastic that can withstand harsh mechanical and seawater exposure. For low friction and wear, an engineering grade plastic, such as acetal, nylon, and polyethylene, is preferred.

Figure 4A:
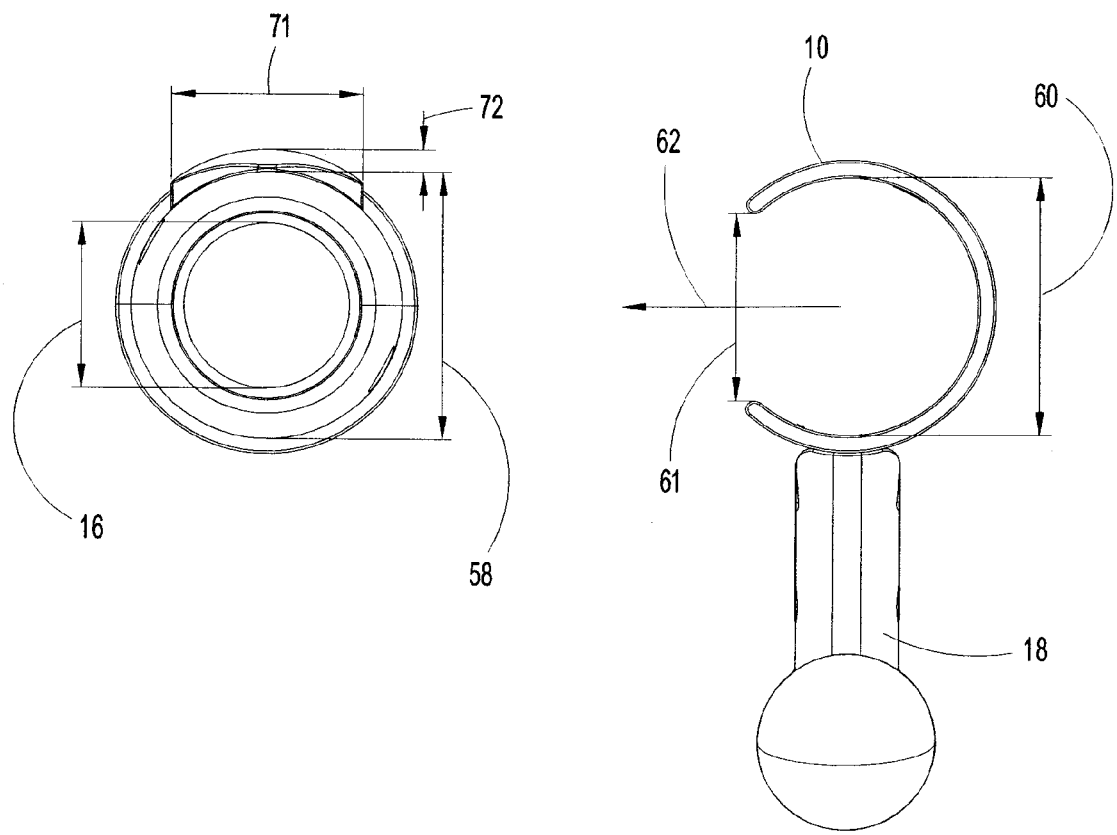
FIGS. 4A-4E are front (FIG. 4A) and side elevation (FIGS. 4B-4E) views of a section of an underwater cable showing a system according to the invention and an associated procedure for attaching an external device to the cable at a known location.

As shown in FIG. 4A, the outer diameter 58 of the inner race 32 is slightly larger than the diameter 16 of the seismic cable. The inside diameter 60 of the cuff is slightly larger in diameter than the inner race, but less than the diameter of the inner race plus the thickness 72 of the boss. The width 61 of the gap at the throat 12 of the cuff is slightly larger than the cable diameter and the maximum circumferential dimension 71 of the boss, but less than the diameter of the inner race. These diametrical differences create an interlocking condition and a highly reliable fault tolerant connection.

Figure 4B:
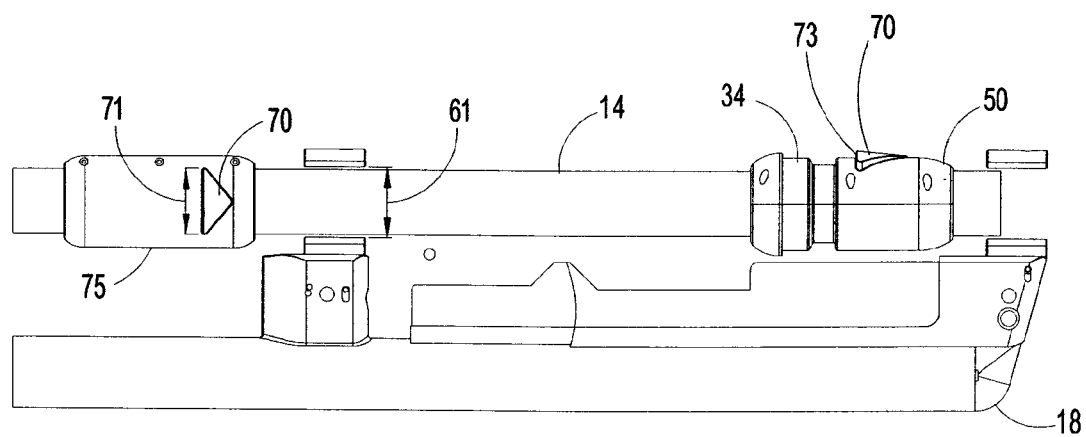
Figure 4C:
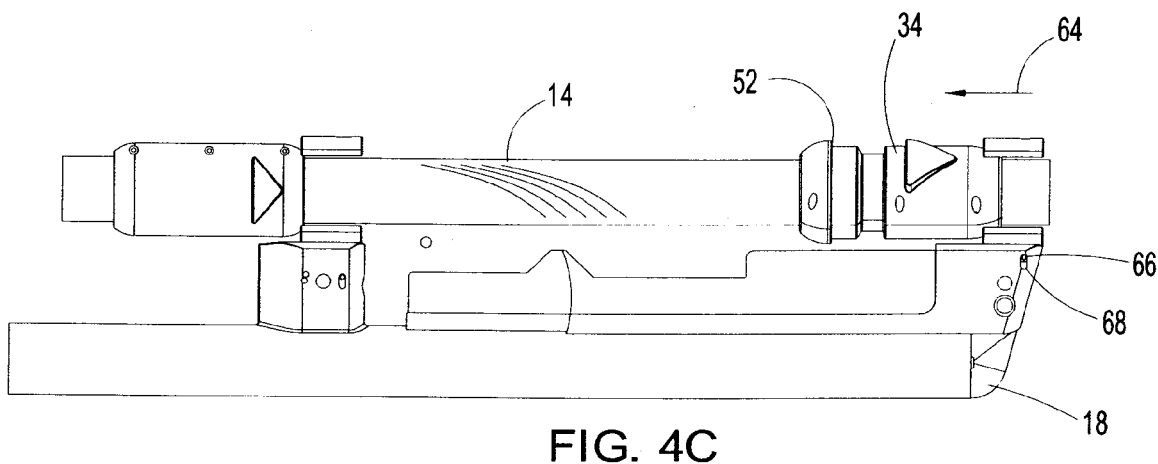
Figure 4D:
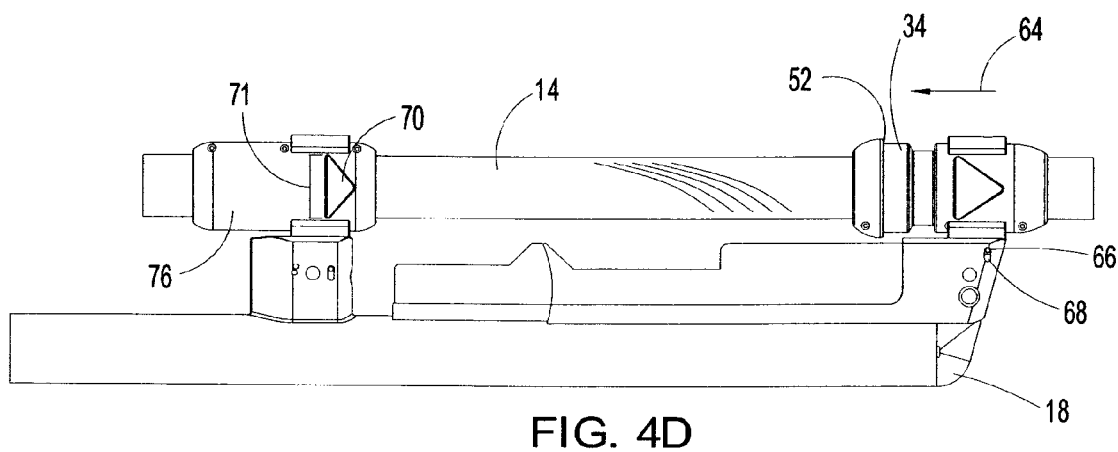
Figure 4E:
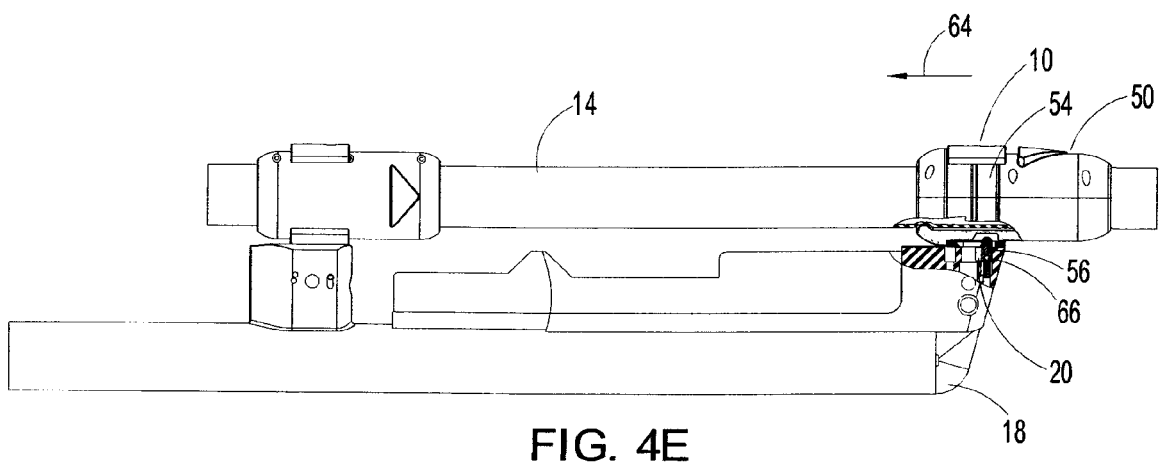

A method for attaching an external device to a streamer cable is shown in FIGS. 4A-4E. First, an external device 18, retained to fore and aft cuffs 10 by its dovetail pins 24, is installed by positioning each external cuff in front of and to the side of the forward inner collar 32 and an aft inner collar 75, which forms a peripheral race 76 and could have, but does not have to have, a groove and rear shoulder like those on the forward collar (FIGS. 4A and 4B). Then a radial motion perpendicular to the cable, as indicated by arrow 62, is required to slip each cuff and its throat over the cable to suspend the external device from the cable. In this configuration, the cable temporarily supports the device. The two inner collars associated with the external device are preferably mounted to the cable with their bosses 70 circumferentially offset from each other. The offset shown in FIG. 4B is about 90° mainly to better illustrate the offset, but could be much less. Before engaging the inner collars with the cuffs, the cable is manually twisted or the cuffs are rotated relative to each other around the cable, as shown in FIGS. 4C and 4D, to longitudinally align the bosses of the fore and aft inner collars 32, 75. (In solid streamers, which cannot be twisted manually, one or both collars would be rotatable about the cable. The collars would be held in place on the cable by a friction fit, which could be overcome by a manually applied rotational force. Liquid-filled streamers can be twisted manually to align the bosses without having to rotate the collars about the streamer.) Then, a secondary longitudinal motion, indicated by arrow 64, along the length of the cable (FIG. 4C) locates the device onto the inner collars 32, 75 with the inner surfaces 26 of the cuffs 10 riding in the inner races 34, 76 so that the cable can rotate inside the cuffs. The gaps in the cuffs allow the cuffs to clear the aligned bosses. The bearing shoulder 52 on the forward collar supports thrust loads and provides positive location. The spring-loaded pin 56 located in the external device automatically extends into the groove 54 in the forward inner race 34 and prevents forward motion of the external device under most conditions. (A spring-loaded pin is not required to engage the aft inner race.) The bosses, which are out of longitudinal alignment when the cable is untwisted, provide additional locking protection against forward motion of the external device. The stops 73 on the offset bosses interfere with the removal of the cuffs from the collars. The device is ready for deployment with the cable in its normal (untwisted) operational state as shown in FIG. 4E. To detach the external device from the cable, the retractable pin is first lowered out of the groove by downward pressure on a stub 66 extending out perpendicularly from the pin through a vertical slot 68 in the external device. The cable is also twisted or the cuffs rotated around the cable relative to each other to realign the bosses. The remainder of the detachment process is just the reverse order of the attachment procedure.

Figure 5:
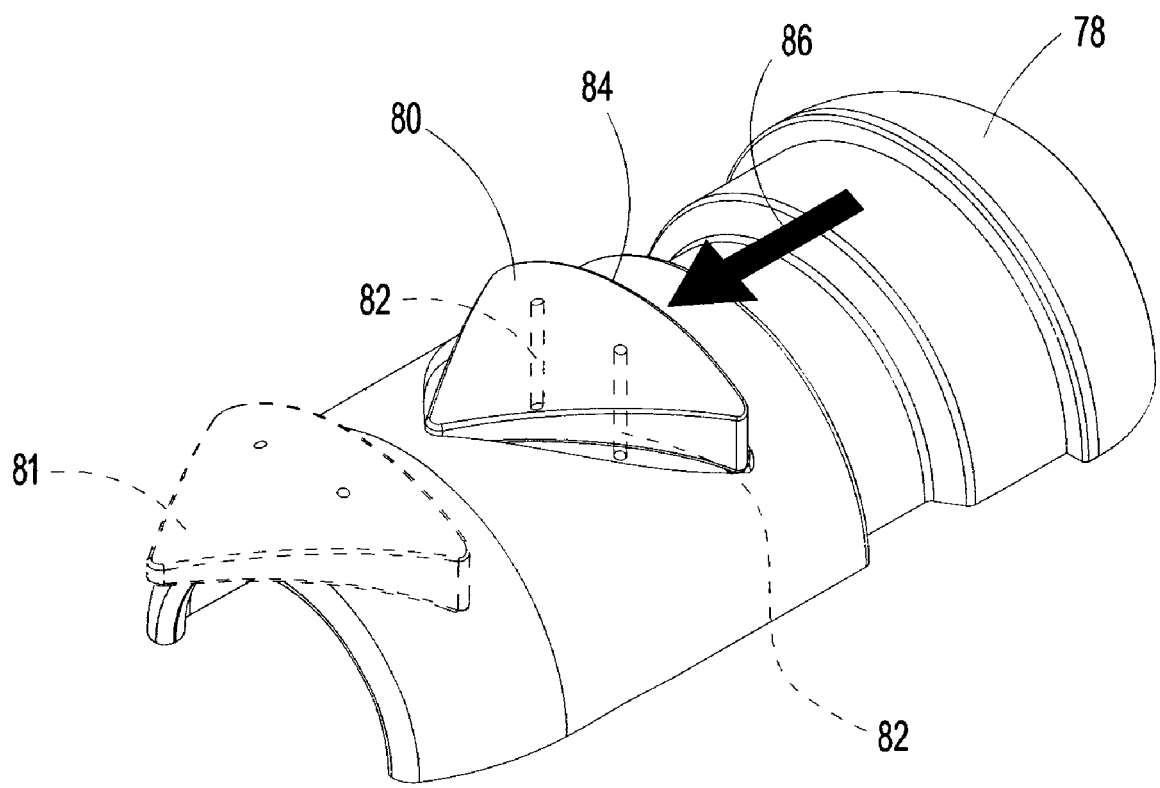
FIG. 5 is a perspective view of one half of another version of an inner collar with a sacrificial boss.

Another version of a collar usable with the cuff is shown in FIG. 5. The collar half 78 shown includes a separable boss 80 that has a pair of shear pins 82 extending from its bottom side and into the collar. The other half of the collar may be the same as in FIG. 3. When the rear bearing surface 84 of the boss is subjected to a forward force 86, or thrust load, greater than the shear threshold of the pins, the pins break, releasing the boss 81 and freeing the external device attached to the cuff. The shear threshold is preferably selected to be greater than the thrust loads that the boss would encounter due to wave action and normal operating conditions, but less than severe thrust loads that may be caused by a large foreign object snagging the external device. Other sacrificial boss means include making the boss out of a material, such as a foam, that deforms under thrust loads greater than a predetermined threshold to release the cuff and attaching the boss to the collar with an adhesive or other bond that yields under thrust loads greater than a predetermined threshold. Thus, the boss can serve as a sacrificial element that prevents serious damage to the streamer.

Figure 6A:
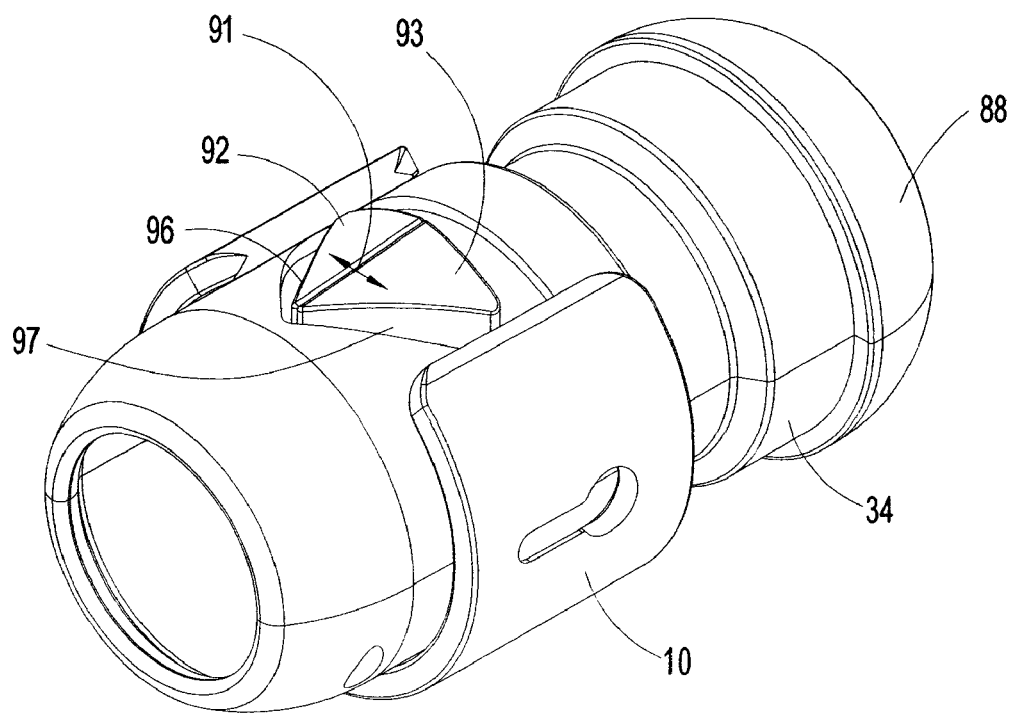
FIGS. 6A and 6B are perspective views of yet another version of an inner collar having an expandable boss shown in unlocked and locked positions.
Figure 6B:
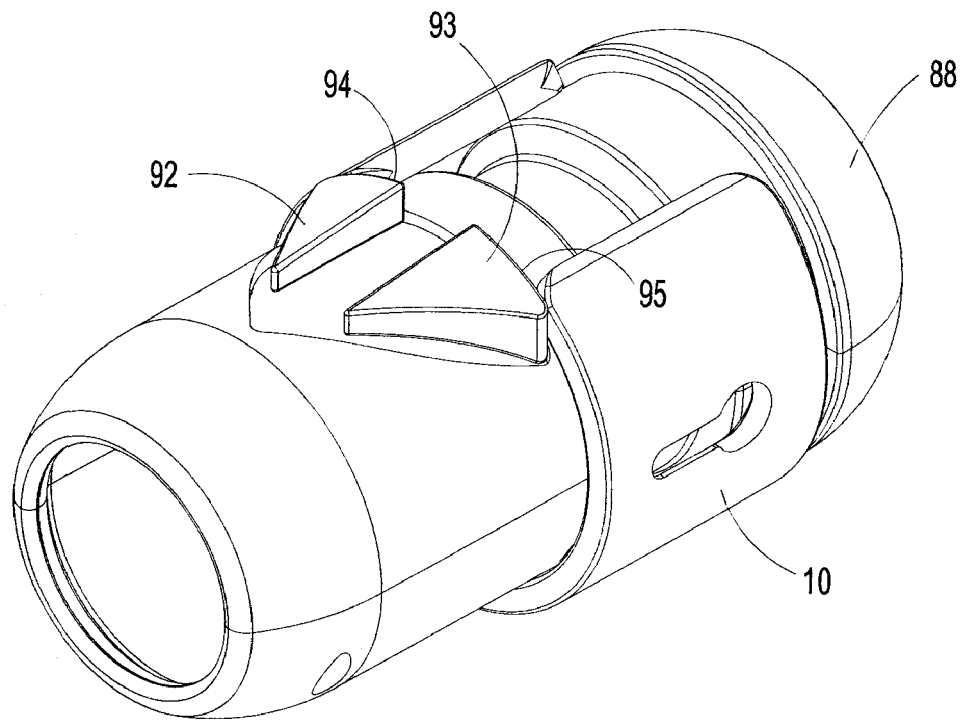

A collar with an expandable boss is shown in FIGS. 6A and 6B. The collar 88 has a boss 90 having two portions 92, 93 that can move between an unlocked position as in FIG. 6A and a locked position as in FIG. 6B as indicated by arrow 91. In FIG. 6A, the two boss portions are held together to allow a cuff 10 to slide past to or from the race 34 during installation or removal. When in the unlocked position, the maximum circumferential dimension of the boss is less than or equal to the width of the cuff's gap. Once the cuff clears the compressed boss, the two portions separate into the locked position of the boss as shown in FIG. 6B. In the locked position, the base portions 94, 95 are far enough apart to span the gap and lock the cuff on the race at all circumferential positions of the cuff. One or both boss portions could be spring-loaded into the normal expanded and locked position. Compressing the spring by pushing against the two sides 96, 97 would move the two boss portions to the unlocked position. Releasing the pressure on the two sides would allow the spring to spread the two boss portions circumferentially apart to the locked position.

Figure 7:
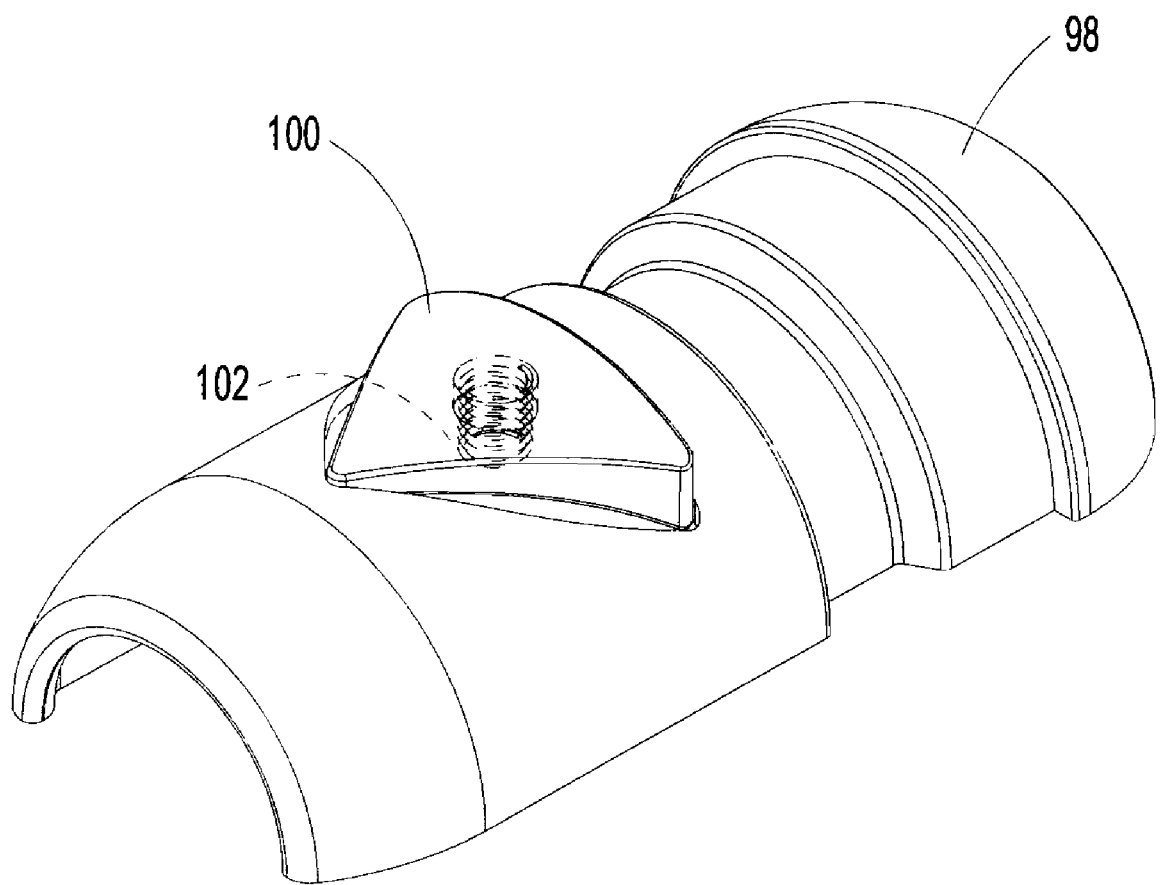
FIG. 7 is a perspective view of one half of another version of an inner collar with a pushbutton boss.

One half of an inner collar is shown with a spring-loaded, pushbutton boss in FIG. 7. The other half of the collar may be the same as in FIG. 3. The collar half 98 has a boss 100 retaining a spring 102 attached at its distal end to structure in the collar below the boss across a gap. The spring biases the boss normally into a raised, locking position. Downward pressure, such as finger pressure, applied to the pushbutton boss causes it to retract into the gap in the collar in an unlocked position for easy installation or removal of the cuff.

Although the invention has been described in detail with reference to a preferred version, other versions are possible. For example, external devices requiring only a single attachment point using a single cuff and inner race are possible with the invention. In a two-cuff attachment, the rear inner race could have, but need not have, a circumferential groove and a cooperating retractable pin or a shoulder acting as a longitudinal stop. The gap forming the throat could be of constant width, as shown in the drawings, or could alternatively be narrower at one end than at the other. The cuff could have only a single keyway if attachment of two external devices at a common location is not required. Instead of attaching to an external device by means of a dovetail pin retained in a keyway, other attachment means are possible. For example, the cuff could be semi-permanently fastened to the external device by screws or other fasteners or permanently attached by adhesives or formed as an integral part of the external device. As another example, in a two-cuff, two-collar connection, a boss is needed on only one of the collars to provide adequate locking of the external device in some situations. The method of attachment can be manually performed as described or performed by an automated device handling system. The invention also has application on untowed seabottom-deployed cables to which similar external devices are attached. Therefore, the spirit and scope of the claims are not limited to the description of the preferred version.

What is claimed is:

1. A connection system for connecting an external device to a location on an underwater cable, the connection system comprising:
    a first collar attached around a longitudinally extending underwater cable at a first location, the first collar having an outer cylindrical race encircling the underwater cable and a raised boss on a periphery of the first collar forward of the outer cylindrical race, wherein the raised boss has a rear bearing surface extending circumferentially part of the way around the periphery and perpendicular to the underwater cable, the rear bearing surface defining a forward end of the outer cylindrical race;
    a second collar attached around the underwater cable at a second location aft of the first location, the second collar having an outer cylindrical race encircling the underwater cable and a raised boss on a periphery of the second collar forward of the outer cylindrical race, wherein the raised boss has a rear bearing surface extending circumferentially part of the way around the periphery and perpendicular to the underwater cable, the rear bearing surface defining a forward end of the outer cylindrical race;
    a first C-shaped cuff including an outer surface having attachment means for attaching an external device to the outer surface, an inner surface defining an inner diameter, and a throat formed by a longitudinal gap between the ends of the C, wherein the gap has a width greater than or equal to a maximum circumferential dimension of the boss on the first collar;
    a second C-shaped cuff including an outer surface having attachment means for attaching an external device to the outer surface, an inner surface defining an inner diameter, and a throat formed by a longitudinal gap between the ends of the C, wherein the gap has a width greater than or equal to a maximum circumferential dimension of the boss on the second collar;
    wherein in a normal operating state, the first and second collars are inserted into the first and second cuffs, respectively, such that:
    the outer cylindrical races of the first and second collars are rotatably engaged with the inner surfaces of the first and second cuffs, respectively, and the rear bearing surfaces of each raised boss are located forward of each cuff; and
    one of the first and second raised bosses is circumferentially offset from one of the gaps in the first and second cuffs whenever the other of the first and second raised bosses is circumferentially aligned with the other of the gaps in the first and second cuffs,
    whereby removal of the cuffs from the collars by a force acting in the forward direction on the cuffs is prevented.

2. A connection system as in claim 1 wherein the boss on the first collar and the boss on the second collar are made of a deformable material that deforms under thrust loads greater than the thrust loads due to wave action.

3. A connection system as in claim 1 wherein the bosses are triangular-shaped.

4. A connection system as in claim 1 wherein the inner diameters of the C-shaped cuffs are greater than the outside diameters of the races, but less than the outside diameters of the races plus a maximum radial thickness of the bosses.

5. A connection system as in claim 1 wherein the bosses are sacrificial elements having shear pins that yield under thrust loads against the bosses greater than the shear threshold of the shear pins.

6. A connection system as in claim 1 wherein the bosses are each expandable from an unlocking position in which the width of the gap is greater than or equal to the maximum circumferential dimension of the boss to a locking position in which the boss expands to span width of the gap.

7. A connection system as in claim 1 wherein the bosses are spring-loaded pushbuttons.

8. A connection system as in claim 1 wherein the bosses each include two portions circumferentially separable from each other.

9. A connection system as in claim 1, wherein at least one of the first and second collars further includes a raised shoulder on the periphery of the first collar aft of the outer cylindrical race, such that the rear bearing surface of the boss and the raised shoulder define forward and aft ends of the outer cylindrical race, respectively.

10. A connection system for connecting an external device to an underwater cable, the connection system comprising:
    a collar attached to a longitudinally extending underwater cable, the collar including an outer cylindrical race encircling the underwater cable and a raised boss on a periphery of the collar forward of the outer cylindrical race, wherein the raised boss has a rear bearing surface extending circumferentially part of the way around the periphery of the collar and perpendicular to the length of the underwater cable, the rear bearing surface defining a forward end of the outer cylindrical race; and
    a C-shaped cuff having an outer surface with attachment means for attaching an external device to the outer surface, an inner cylindrical surface engaged with the outer cylindrical race of the collar, and a throat formed by a longitudinal gap between the ends of the C, wherein the gap has a width;
    wherein the boss includes two circumferentially separable portions, and the boss is movable between a contracted, unlocked configuration, in which a maximum circumferential dimension of the boss is less than or equal to the width of the gap, and an expanded, locked configuration, in which the maximum circumferential dimension of the boss is greater than the width of the gap.

11. A connection system as in claim 10 wherein the boss is triangular-shaped.

12. A connection system as in claim 10 wherein the boss is a sacrificial element having shear pins that yield under thrust loads against the boss greater than the shear threshold of the shear pins.

13. A connection system as in claim 10 wherein the boss is a spring-loaded pushbutton.

14. A connection system as in claim 10, wherein the collar further includes a raised shoulder on the periphery of the collar aft of the outer cylindrical race, such that the rear bearing surface of the boss and the raised shoulder define forward and aft ends of the outer cylindrical race, respectively.

* * * * *